Nov. 16, 1954     M. C. TURKISH     2,694,389
VALVE GEAR LENGTH ADJUSTING MECHANISM
Filed Oct. 14, 1952     5 Sheets-Sheet 2
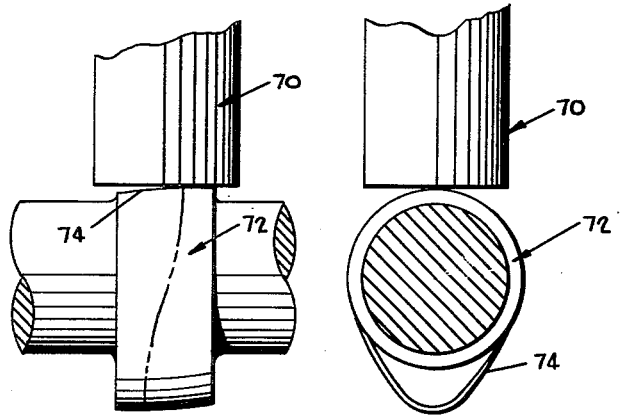
FIG_6    FIG_5
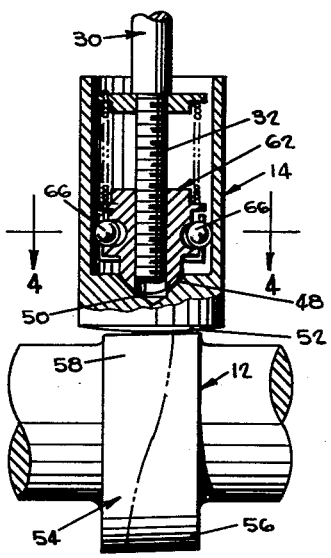
FIG_3
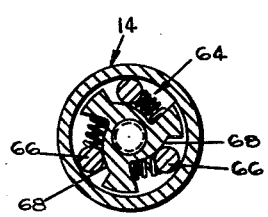
FIG_4
INVENTOR.
MICHAEL C. TURKISH
BY
ATTORNEYS

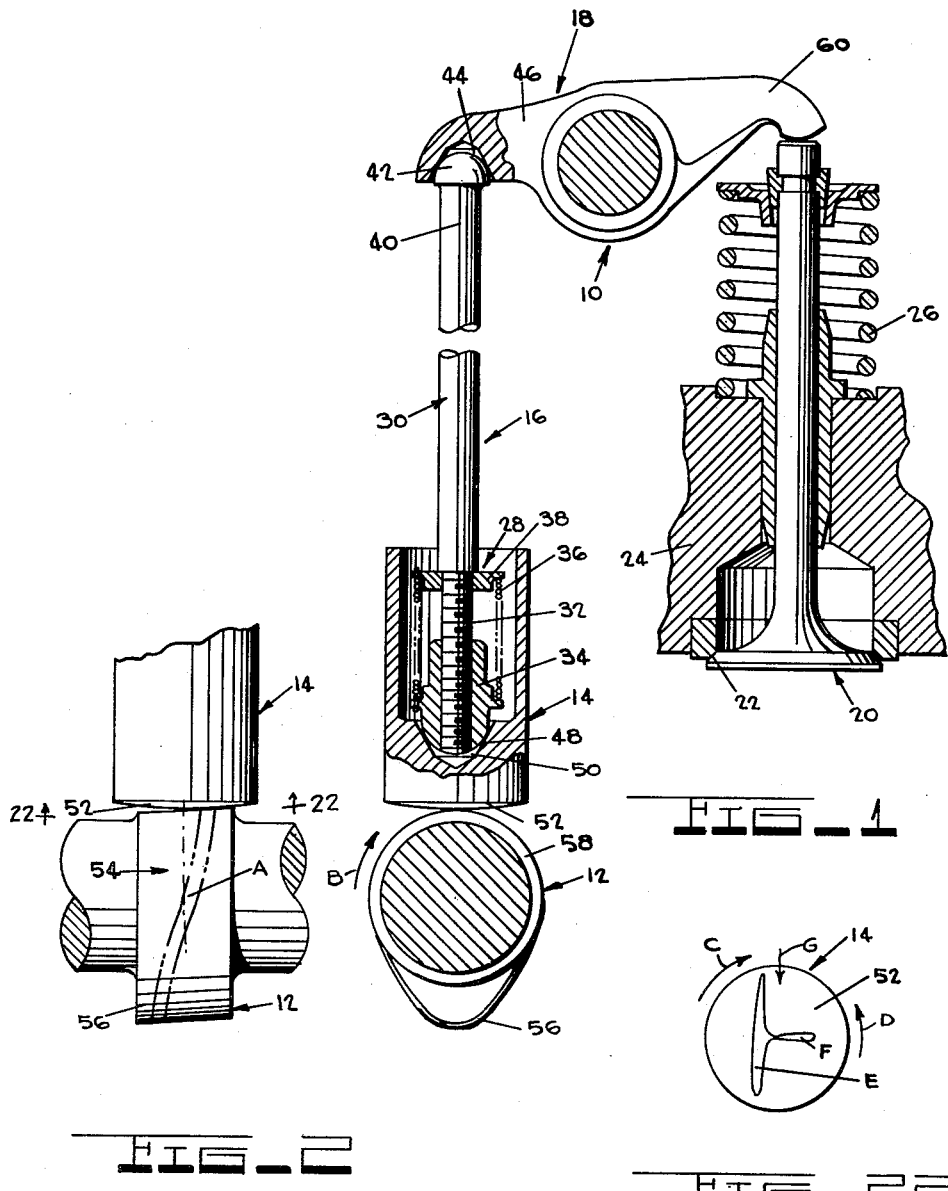

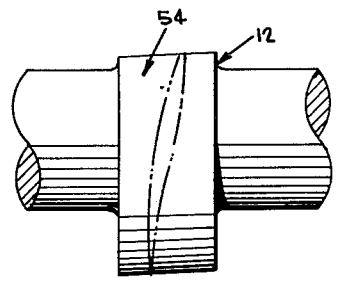
FIG_7
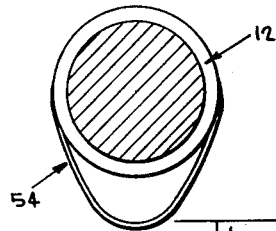
FIG_11
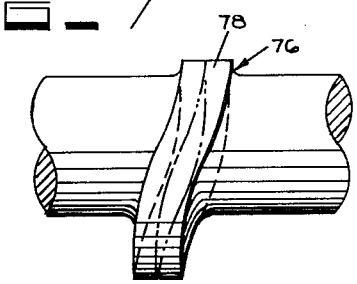
FIG_8
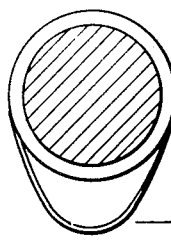
FIG_12
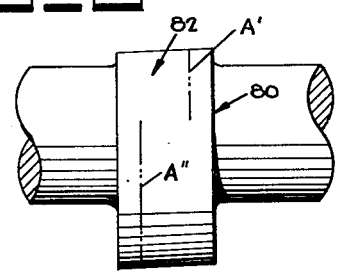
FIG_9
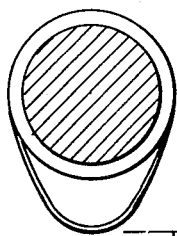
FIG_13
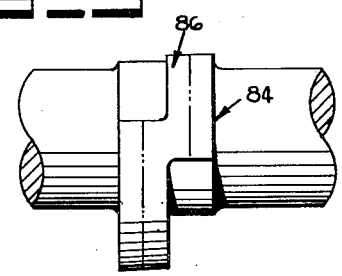
FIG_10
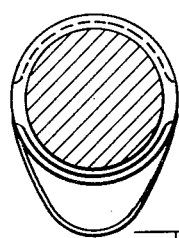
FIG_14
*INVENTOR.*
MICHAEL C. TURKISH
BY
ATTORNEYS

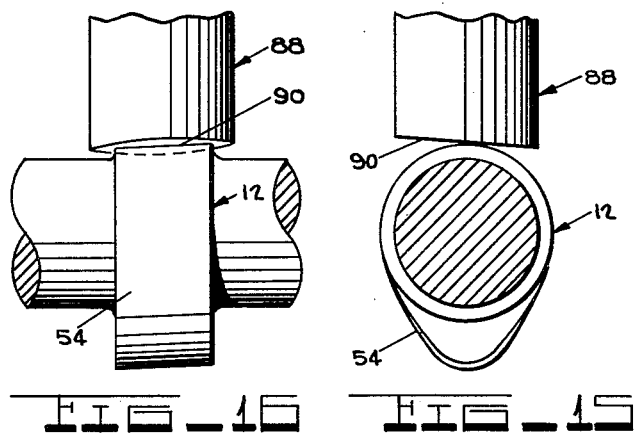
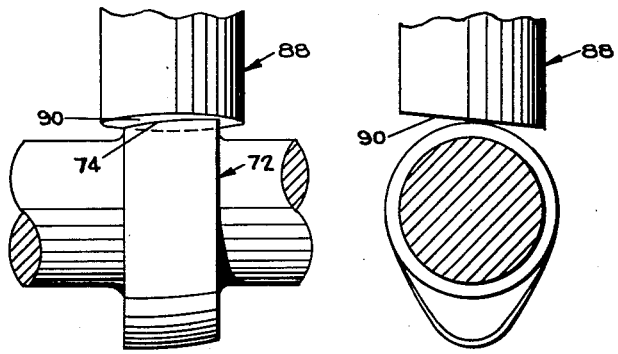
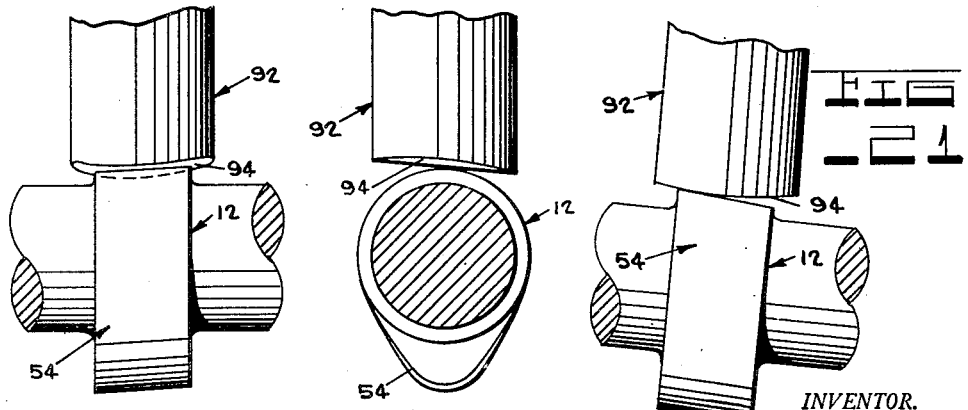

Nov. 16, 1954    M. C. TURKISH    2,694,389
VALVE GEAR LENGTH ADJUSTING MECHANISM
Filed Oct. 14, 1952    5 Sheets-Sheet 5
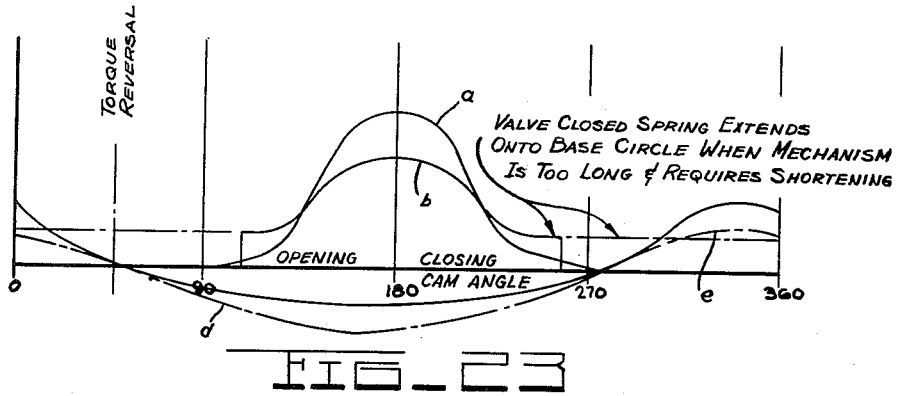
FIG_23
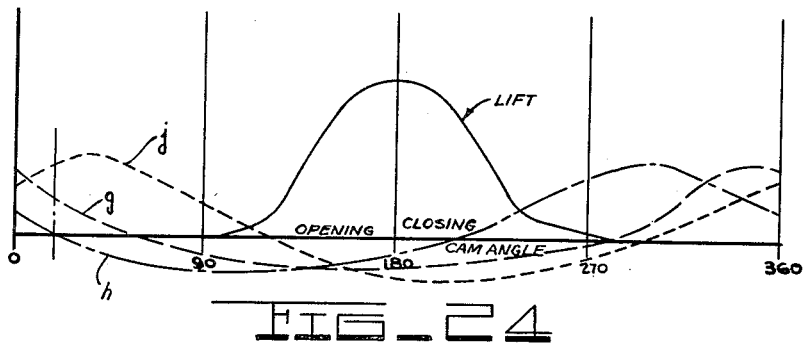
FIG_24
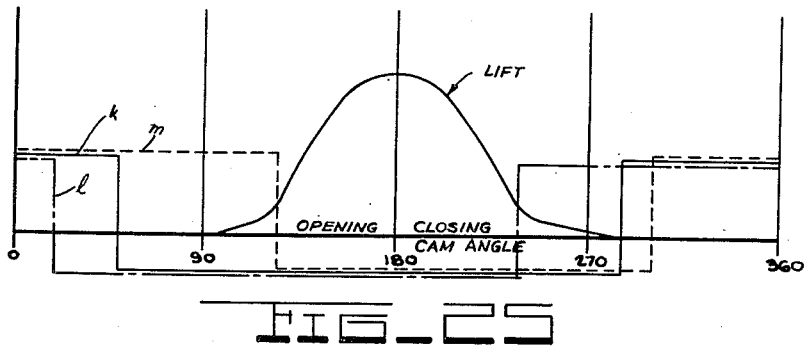
FIG_25
INVENTOR.
MICHAEL C. TURKISH
BY
ATTORNEYS United States Patent Office 2,694,389
Patented Nov. 16, 1954

2,694,389

VALVE GEAR LENGTH ADJUSTING MECHANISM

Michael C. Turkish, Centerline, Mich., assignor to Eaton Manufacturing Company, Cleveland, Ohio, a corporation of Ohio Application October 14, 1952, Serial No. 314,627

12 Claims. (Cl. 123—90)

This invention relates to valve gear systems for internal combustion engines and more particularly to mechanical means for automatically compensating for variations in the length of the operating components of said systems.

Broadly the invention comprehends the provision of a mechanical, length self-adjusting mechanism in the form of a torsion spring loaded screw and nut assembly incorporated in the component members of a valve operating mechanism and wherein through prescribed turning of one member of the screw and nut assembly relative to the other member thereof a shortening or elongating compensation for the valve operating mechanism is attained. As a means of ensuring the turning of one member of the screw and nut assembly during the course of a valve operation cycle, the cam, of the valve operating mechanism, is provided with a predeterminedly shaped peripheral surface whereby during the course of rotative engagement of the peripheral surface of the cam on an end engageable surface of the tappet, of the valve operating mechanism, a varying degree of turning is imparted to the tappet. This turning of the tappet may or may not be in turn directly imparted to one member of the screw and nut assembly, depending on the phase of the valve operating cycle.

Among the principal objects of the invention are the provision of a mechanical length self-adjusting valve operating mechanism for internal combustion engines that;

1. Is effective and efficient in operation;
2. Provides for the distribution of wear on the cam engaging surface of a tappet, constituting an element of the mechanism;
3. Ensures an automatic shortening or elongating adjustment of the valve operating mechanism to compensate for expansion, contraction, wear etc., resulting in the operation of the mechanism.
4. Includes a torsion spring loaded nut and screw assembly effective through the rotative movement of one of the members relative to the other member to vary the length of the assembly and consequently the length of the valve operating mechanism; and
5. Includes a cam, constituting an element of the mechanism, having a surface herein defined as a "wobble surface" for engagement with the cam contacting surface of the tappet of the mechanism, providing for the prescribed turning of the tappet so as to effect an automatic adjustment of the nut and screw assembly of the mechanism.

Other objects and advantages of the invention will appear from the following description taken in connection with the drawings forming a part of the specification; and in which:

Fig. 1 is an elevation partly cross-sectional view of a valve operating mechanism incorporating automatic length compensation means therein;

Fig. 2 is a partly fragmentary side elevation view of the tappet and cam of Fig. 1;

Fig. 3 is an elevation partly cross-sectional view of a modified form of length compensating mechanism and tappet, from that of Fig. 1, in association with a like cam as Fig. 1 and Fig. 2;

Fig. 4 is a cross-sectional view taken substantially along lines 4—4 of Fig. 3;

Fig. 5 is a modified form of tappet and cam, from that of Figs. 1 and 2;

Fig. 6 is a fragmentary side elevation view of Fig. 5;

Figs. 7 through 10 illustrate modified forms of cams to be utilized in conjunction with the valve operating mechanism of Fig. 1;

Figs. 11 through 14 are end cross views of the respective cams of Figs. 7 through 10;

Fig. 15 is an elevation view of a further modified form of tappet from Fig. 1 in association with a cam like Fig. 1;

Fig. 16 is a side elevation view of Fig. 15;

Fig. 17 is an elevation view of further modified tappet and cam arrangement;

Fig. 18 is a side elevation view of Fig. 17;

Fig. 19 is an elevation view of a further modified tappet and cam arrangement;

Fig. 20 is a side elevation view of Fig. 19;

Fig. 21 is a side elevation view of Fig. 19, opposite from the side view of Fig. 20;

Fig. 22 is a view of the bottom of the tappet of Fig. 2 taken substantially along lines 22—22 of Fig. 2; and Figs. 23 through 25 illustrate curves relating to various valve lift, spring load contact movement for various cam angle positions.

Similar reference characters indicate corresponding parts throughout the several views of the drawings.

The present mechanism for self-adjusting the length of a valve operating mechanism for internal combustion engines was devised primarily for the purpose of providing mechanical means for accomplishing the desired result in a quiet, efficient and effective manner while simultaneously prolonging the life of the component parts thereof. In so being mechanical, the fluid problem present in conventionally used hydraulic lifters is dispensed with.

Basically the means for effecting self-adjustment of the valve operating mechanism comprises a torsion spring loaded screw and nut assembly which can be lengthened or shortened dependent on the relative rotation between the screw and nut elements thereof and a wobble surfaced cam adapted to be engageable with a cam contacting surface of a tappet interposed between the assembly and the cam, providing for rotating or turning the tappet effective to shorten the length of the assembly. The assembly is effective to be lengthened under the influence of the torsion spring forming a part thereof.

Referring to Fig. 1 of the drawings for more specific details of the invention 10 represents generally a valve operating mechanism for an internal combustion engine comprising as component elements thereof a cam 12, a tappet 14, a pushrod assembly 16, a rocker arm 18 and a valve 20.

The mechanism 10 as shown by Fig. 1, is at rest wherein the cam 12 is on its base circle portion and the valve 20 is held in closed position on its seat 22 in engine block 24 by a valve spring 26.

An automatic length compensating device 28 for the valve operating mechanism is incorporated in the pushrod assembly.

The pushrod assembly 16, as it incorporates device 28, includes a preferably slender screw element 30 having a screw threaded portion 32 at one end thereof, a nut element 34 threadingly engageable on the screw threaded portion 32 of element 30 and a torsion spring 36 interconnected between the nut element and a collar 38 secured in stationary relation on screw element 30, normally biasing the nut and screw elements apart from one another.

The screw element 30 includes in addition to the screw threaded portion 32, an opposite axially extended portion 40 terminating at its extremity 42, opposite axially disposed from the threaded portion, in a portion of a sphere. The spherical end 42 of the screw element 32 is received in annular line bearing relation in a conical shaped socket 44 formed in one arm 46 of the rocker arm.

Nut element 34 has a partial spherical surface 48 on one end thereof, adapted to be received in annular line bearing relation in a socket 50 formed internally of tappet 14.

A crowned or spherical faced cam engaging surface 52 is provided on one end of the tappet 14 oppositely disposed from socket 50 thereof adapted for engagement with a wobble surface 54 of cam 12.

Cam 12 as viewed in Fig. 1 appears to be substantially a conventional form of cam having a lobe portion 56 and a base circle portion 58. Fig. 2 highlights the prescribed angularity and curvature of the peripheral surface of the cam wherein a schematically marked path A defines the wobble surface of engagement between the tappet cam engaging surface 52 and the wobble surface 54. The path A as noted veers from one side of center of the tappet and cam, wherein engagement of the peripheral surface of the base circle portion of the cam is to one side of center of the tappet as viewed in Fig. 2 whereas the peripheral surface of the lobe portion of the cam is to the other side of center of the tappet. The peripheral surface of the cam as shown by Fig. 2 is the exact opposite of the peripheral surface on the other side thereof since as shown by Fig. 1, the cam is symmetrical as to the ascending and descending portions of the lobe and the radius of the base circle is substantially uniform throughout. Whereas the angularity of the surface of the base circle portion of the cam is a maximum amount at the midpoint thereof and decreases uniformly in both directions therefrom to substantially no angularity at the junction of the base circle and lobe portions, the angularity of the surface of the lobe portion of the cam, which lies opposite to the angularity of the surface of the base circle portion of the cam, is a maximum amount at the midpoint and decreases uniformly to substantially no angularity at its junction with the base circle portion of the cam. The changeover from angularity of the surface of the base circle portion of the cam to the surface of the lobe portion thereof is a smooth one whereby torque reversal, in the case of passing from the base circle to the lobe portions of the cam, occurs several degrees prior to the lift cycle so that rotation of the tappet in one direction is stopped and the tappet may thus remain stationary for a short interval of cam rotation.

The construction of the wobble surface of the cam is such that for a clockwise rotation of the cam designated by arrow B of Fig. 1, a clockwise torque C will be produced upon the tappet, shown by Fig. 22, when the surface 52 of the tappet engages the surface of the base circle portion of the cam and a counter-clockwise torque D, shown by Fig. 22, will be produced when the surface 52 of the tappet engages the surface of the lobe portion of the cam. E designates the path of contact of cam surface 56 upon the tappet surface 52 to produce counter-clockwise rotation D and F designates the path of contact of cam surface upon the tappet surface 52 to produce clockwise rotation C, as the cam moves across the tappet face in the direction of arrow G.

By making surface 52 of the tappet of predetermined crowned or spherical form, sufficient alignment can be attained between the engageable surfaces of the cam and tappet wherein the surface of the cam can be made to engage precisely at or near desired locations or zones of tappet surface 52.

The friction provided between the spherical end 42 of the screw element and the socket 44 of the rocker arm is purposely of a high coefficient sufficient to resist the turning resistance between the threads of the screw and nut elements as regards the action of the screw element threading into the nut element for a shortening operation of the pushrod assembly.

A high coefficient friction is also provided, between the spherical surface 48 of the nut element 34 and the socket 50 of the tappet, of an amount sufficient to provide for the coupled turning of the tappet and nut element in a clockwise direction to overcome the combined turning resistance offered by the threads of the screw and nut elements in a threading together thereof and the pre-load of torsion spring 36. At the same time a relative rotation of the tappet to the nut element, in a counter-clockwise direction, is permitted against the resistance offered by the threads in attempting to thread apart the screw and nut elements when a load is imposed thereon. It is to be understood that the friction, provided between the nut element and tappet as relates to the nut and screw elements assembly, as above defined, is effected by a load imposed on the component members of the valve operating mechanism, such as by the valve spring 26.

The friction engagement provided between the spherical end of the nut element and the socket of the tappet and between the spherical end of the tappet is purposely made of an annular line bearing nature so as to prevent oil film formation between these surfaces which would ordinarily tend to destroy an established friction relation therebetween. This is necessary since the continued maintenance of a substantially predetermined friction is essential to the proper operation of the adjusting device and the valve operating mechanism.

In a normal operation of the valve operating mechanism of Fig. 1 assuming that as shown the component valve 20, rocker arm 18, pushrod assembly 16, tappet 14 and cam 12 are in substantially perfect engagement with one another, that is with zero clearance throughout, with the valve on its seat, and with no other load than torsion spring 36, a rotation of the cam in a clockwise direction from one angular extremity to another of its base circle portion surface will cause no appreciable actuation of the tappet or any other component element of the valve operating mechanism. This result is occasioned by the fact that since appreciably no load is imposed between the engaging surfaces of the cam and tappet, slippage will occur therebetween. Should any clockwise rotation of the tappet occur, which rotation is in turn imparted to the nut element 34 by way of the friction connection between the tappet and nut element acting to shorten the pushrod wherein the nut and screw elements are threaded righthand, the torsion spring 36 will operate to immediately restore the pushrod assembly to a length to maintain zero clearance throughout the valve operating mechanism. As such no actual movement of the rocker arm and valve will thus occur.

As the cam is further rotated clockwise from the position where the base circle portion joins with the lobe portion, until where the lobe portion joins with the base circle portion on substantially the diametrically opposite side of the cam, an opening or lifting and a closing cycle of operation of the valve takes place. During this cycle of operation with the valve spring offering resistance to movement of the valve an axial load is imposed on the component elements of the valve operating mechanism whereby zero clearance engagement is had between the valve 20 and an arm 60 of the rocker arm, the arm 46 of the rocker arm and the spherical end 42 of the screw element 30, the screw element in turn transmitting its motion to the nut element 32 without normal relative movement therebetween, the nut element engaging the tappet 14, and the tappet engaging the cam. With this condition of engagement existing between the elements of the valve operating mechanism and with the surface on the lobe portion of the cam engaging the tappet along the path A thereof at a given radius arm to the centerline of the tappet, and with the cam rotating clockwise, the tendency is for the tappet to be rotated counter-clockwise. Should the friction between the surfaces of the tappet and cam be of a value greater than the friction between either the spherical end of the nut element and socket of the tappet or the spherical end of the screw element and the socket of the rocker arm, it will be rotated counter-clockwise. In this case slippage will occur between either the screw element and rocker arm or the nut element and tappet, since the resistance to threading apart of the screw and nut elements, with the axial load of the valve spring thereon, is greater than the friction between the screw element and rocker arm and between the nut element and tappet. In actuality, since the friction between the engageable tappet and cam surfaces is also of an amount less than the resistance to threading apart of the screw and nut elements under the valve spring load, slippage will occur between the tappet and cam engageable surfaces. Generally the friction between the tappet and cam face will be much lower than that provided between the screw element and rocker arm and between the nut element and tappet and as such the tappet would not be rotated counter-clockwise.

Immediately after the passing of the surface of engagement of the cam from the lobe to the base circle portion thereof, wherein a gradual smooth transition from counter-clockwise to clockwise torque production is had between the tappet and cam engaging surfaces along the path A of the cam, a length adjustment of the pushrod assembly is effected, that is if a length adjustment is required.

In the case of an expansion of the length of the valve operating mechanism tending to hold the valve off its seat, the clockwise torque produced between the surface of the base circle portion of the cam and the surface of the tappet will operate to rotate the tappet clockwise. The rotation of the tappet is then transmitted, by way of the frictional engagement between the socket of the tappet and the spherical surface of the nut element to the nut element having a righthand screw thread. Since the resistance to threading up of the screw and nut elements is less than the friction between the nut element and tappet and screw element and rocker arm, a shortening of the pushrod assembly is accomplished. The amount of shortening effected will be equivalent to the amount necessary to seat the valve and to maintain a minute clearance between the elements of the valve operating mechanism. As soon as this shortening operation is completed, any further movement of the base circle portion of the cam across the tappet face will be ineffective to rotate the tappet appreciably inasmuch as solely the load of torsion spring 36 causes the tappet surface to bear on the cam surface. As such the torsion spring will maintain zero clearance.

If wear or contraction occurs in the valve operating mechanism during a lobe portion of operation thereof, acting to shorten the normal length thereof and thus introduce clearance, compensation therefor will occur when the cam returns to its base circle, wherein the torsion spring 36 will be immediately responsive to take up said clearance and thus return the mechanism to a zero clearance condition.

Through the provision of the wobble surface 54 on the cam, a rotation of the tappet is so accomplished which will prevent the grooving of the tappet surface at any particular point through the equal distribution of wear across the greater portion of the tappet surface. Furthermore this precise wobble surface provides for all of the adjustment for shortening the valve operating mechanism while the tappet is on the base circle.

Figs. 3 and 4 are directed to the provision of a modified nut element 62 as it relates to its connection with tappet 14 wherein a one-way clutch 64 is provided between the nut element and tappet.

The one-way clutch includes a plurality of spring pressed balls 66 slidable on cams 68 provided in the body of nut element 62 and engageable with the inner cylindrical wall of the tappet. The balls are so directionally spring pressed that a counter-clockwise direction of rotation of the tappet as viewed in Fig. 4 will result in a positive rotation of the nut element 62 therewith, whereas a clockwise rotation of the tappet as viewed in Fig. 4 will release the one-way clutch from locking engagement between the nut element and tappet. Whereas the one-way clutch 64 will, upon rotation of cam 12 with its lobe portion surface in engagement with the tappet surface 52, permit of the clockwise rotation of the tappet without transmission of torque therethrough between the nut element 62 and tappet 14, and an engagement of the surface of the base circle portion of the cam with the tappet provides for the transmission of torque by way of the one-way clutch 64 from the tappet to the nut element for the threading up of the nut element on the screw element, to obtain the automatic shortening of the mechanism as required.

Figs. 5 and 6 illustrate the use of a flat face tappet 70 in associated engagement with a wobble surface cam 72 having a transverse radial crown 74 across the surface thereof. This cam is in all respects the same as cam 12 and provides for a similar wobble surface of engagement. By so providing an adequate transverse crown 74 on the cam surface, proper contact is obtainable with the face of the tappet even though it is flat and edge loading is avoided thus preventing excessive contact stresses.

Figs. 7 through 14 illustrate various modifications of cams having wobble surfaces wherein Figs. 7 and 11 representative of the group illustrate the cam of Figs. 1 and 2. All of these cams have wobble cam surfaces effective to alternately cause torque change as the cam moves from the base circle portion thereof to the lobe portion thereof.

The surface 54 of cam 12 shown by Figs. 7 and 11 is of the simplest form and can be easily formed by oscillating the grinding wheel axis during the grinding operation in unison with the camshaft rotation.

Figs. 8 and 12 illustrate a cam 76 having a wobble surface 78 differing from the cam 12 of Figs. 7 and 11 in that excess metal is removed from around the wobble path of engagement of the cam.

Figs. 9 and 13 illustrate a cam 80 having a wobble surface 82 of the form wherein although like general appearance is had to the cam of Figs. 7 and 11, it differs greatly therefrom in that a more rapid torque change occurs between the base circle and lobe portions of the cam. This is accounted for since the angularity of surfaces of the base circle and lobe portions of the cam are substantially constant throughout the respective portions thereof with the angularity of the portions opposite one another. Paths A' and A'' represent the paths or zones of engagement on the respective base circle and lobe portions of the wobble surface of the cam. Figs. 10 and 14 illustrate a cam 84 having a wobble surface 86 differing from the cam of Figs. 9 and 13 in that excess metal is removed from around the wobble path of engagement of the cam.

For application wherein a non-rotatable tappet is used in conjunction with a wobble cam, Figs. 16 through 19 serve to illustrate the function of the wobble cam contour in producing torque reversal in the tappet during a cycle of operation.

A tappet 88 having a flat angular cam engaging surface 90 for engagement with the wobble surface 54 of cam 12 is illustrated by Figs. 15 and 16. Because of the angularity of the tappet surface 90 the tappet is made to oscillate through a certain predetermined angular displacement during each lift cycle. As such, a predetermined lift loss may be introduced during the valve lift cycle, which lift loss is then eliminated during the base circle portion of operational engagement between the cam and tappet surfaces. A like pushrod assembly as is employed in the structures of Figs. 1 and 3 is adaptable for use herewith. As such it is operative to account for lift loss introduction in the valve gear mechanism on a valve lift cycle and for the removal thereof on base circle operation through the operative shortening thereof by the transmission of rotative motion thereto or by the elongation thereof on base circle operation through the action of the torsion spring thereof.

The structure of Figs. 17 and 18 illustrate a wobble surfaced cam and tappet differing from Figs. 15 and 16 wherein the wobble surface of cam 72 is crowned similarly to that of Figs. 5 and 6 for the purpose of providing proper contact between the surfaces of the cam and tappet and for the elimination of edge loading.

Figs. 19, 20 and 21 illustrate a further modification of a cam and tappet arrangement wherein a tappet 92 is provided having a transverse cylindrically crowned angular surface 94 for engagement with the wobble surface 54 of cam 12, said cam being the same as that shown by Figs. 1, 2, 7 and 11. Through this arrangement excessive contact stress on the tappet cam engaging surface 94 is eliminated lending to the extended and useful life thereof.

Fig. 23 illustrates typical tappet torque and moment curves as related to lift and spring load wherein "a" is a lift curve, "b" is a spring load at the cam curve, "d" is a curve of the torque to rotate a tappet in a direction to elongate the screw and nut member assembly, and "e" is a curve of the torque required to rotate the tappet in a direction to shorten the screw and nut member assembly if load is on the tappet and valve operating mechanism requires shortening while on base circle. The curves show torque during the full lift interval, and a portion of the base circle just prior to full lift, giving a moment arm in the direction of elongating the screw and nut member assembly. It is only during the base circle interval that a torque exists to shorten the screw and nut member assembly and consequently no lift loss is introduced and an ideal sort of mechanism is obtained. This refers to shortening the mechanism if it requires shortening only when it is on the base circle of the cam. On the other hand, if the mechanism requires to be lengthened this is automatically accomplished, through the self-expanding quality of the screw and nut member assemblies illustrated in the drawings and hereinbefore defined, during the base circle interval of operation. It is to be noted that the torque reversal occurs several degrees prior to the lift period so as to cause the tappet to stop rotation in one direction and perhaps to remain stationary or rotate in the opposite direction.

Fig. 24 illustrates typical range for tappet moment arm curves using gradual change of moment type curves with curve "g" considered to be a typical one, and curves "h" and "j" are considered typical for respectively early and late operation without obtaining notable lift loss.

Fig. 25 illustrates curves of typical range of tappet moment arm using constant moment arms with rapid changes of the type using cam contours as shown in Figs. 9 and 10. Curve "k" is a typical mean curve for tappet moment arm, curve "l" is a curve giving early reverse torque to shorten the mechanism associated with the tappet, and curve "m" is a curve giving late reverse torque to shorten the mechanism associated with the tappet.

In the utilization of the wobble surfaced cams, defined hereinbefore in association with any of the various cam engaging surfaced tappets, alternate torque reversals are applied to the tappet to secure the required torsional oscillation thereof for the proper actuation of the pushrod assembly. Whereas some of the cam-tappet structures provide for the adjustment of the pushrod assembly to shorten same on the base circle portion of operation of the cam, and others provide for lift loss introduction during the valve lift cycle, it is obvious that modifications thereof can provide for the operational actuation of the tappet and pushrod assembly for the shortening of the pushrod assembly during any phase of operation of the valve operating mechanism.

Although the various structures have been shown and defined in regards to specific structural forms and particularly to specific applications thereof, many departures can be made therein without changing the basic fundamentals introduced and accordingly the invention is to be limited only as indicated by the appended claims.

What I claim is:

1. Valve operating mechanism comprising threadingly engaged screw and nut members, a spring normally biasing the members apart, a rotatable cam including a lobe portion and a base circle portion presenting a wobble peripheral surface, and a tappet, engageable with one of the threadingly engaged screw and nut members, having a cam contacting surface on one end thereof engageable with the peripheral surface of the cam, said tappet being reciprocable along an axis perpendicular to the axis of the cam, said peripheral surface of the cam on the base circle portion thereof, being engageable with the tappet surface to effect rotation of the tappet in one direction, when a load presses the tappet and cam together and said peripheral surface of the cam on the lobe portion thereof being engageable with the tappet surface to effect rotation thereof, in a direction opposite to the rotation imparted by the peripheral base circle portion surface on the cam when a load presses the tappet and cam together.

2. A mechanism according to claim 1 wherein the surface of the tappet is crowned.

3. A mechanism according to claim 1 wherein the surface of the base circle portion of the cam is slightly angularly disposed to the axis of the cam and the surface of the lobe portion of the cam is slightly angularly disposed to the axis of the cam, oppositely to the angularity of the surface on the base circle portion.

4. Valve operating mechanism comprising threadingly engaged screw and nut members, a spring normally biasing the members apart, a tappet engageable with one of the members having a cam contacting surface on one end thereof, and a cam rotatable about an axis substantially perpendicular to the axis of the tappet including a lobe portion and a base circle portion presenting a wobble peripheral surface, the major portion of the surface of the base circle portion of which engages the tappet surface to one side of a plane passing through the axis of the tappet and the major portion of the surface of the lobe portion of which engages the tappet surface to the other side of the plane.

5. Valve operating mechanism comprising threadingly engaged screw and nut members, a spring normally biasing the members apart, a tappet engageable with one of the members having a cam contacting surface on one end thereof, and a cam rotatable about an axis substantially perpendicular to the axis of the tappet including a lobe portion and a base circle portion, the surface of the base circle portion of which is slightly angularly disposed to the axis of the cam, with maximum angularity at its midpoint and decreasing substantially uniformly in angularity from the midpoint thereof to zero angularity substantially at the opposite ends thereof, and the surface of the lobe portion of which is slightly angularly disposed to the axis of the cam, oppositely to the angularity of the surface on the base circle portion with maximum angularity at its midpoint and decreasing substantially uniformly to substantially zero angularity at the opposite ends thereof near the opposite ends of the surface of the base circle portion.

6. A mechanism according to claim 5 wherein the tappet surface is crowned in a plane perpendicular to the axis thereof.

7. A mechanism according to claim 5 wherein the tappet surface is angularly disposed a slight amount to a plane perpendicular to the axis thereof.

8. A mechanism according to claim 5 wherein the tappet surface is flat and lies in a plane perpendicular to the axis thereof and the angular surfaces of the base circle and lobe portions of the cam are crowned.

9. A mechanism according to claim 5 wherein the tappet is frictionally coupled to one of the members.

10. Valve operating mechanism comprising threadingly engaged screw and nut members, a spring normally biasing the members apart, a tappet engageable with one of the members having a cam contacting surface on one end thereof, and a cam rotatable about an axis substantially perpendicular to the axis of the tappet including a lobe portion and a base circle portion, the surface of the base circle portion of which is slightly angularly disposed to the axis of the cam, with maximum angularity at its midpoint and decreasing substantially uniformly in angularity from the midpoint thereof to substantially zero angularity at the opposite ends thereof, and the surface of the lobe portion of which is slightly angularly disposed to the axis of the cam, oppositely to the angularity of the surface on the base circle portion with maximum angularity at its midpoint and decreasing substantially uniformly to substantially zero angularity at the opposite ends thereof near the opposite ends of the surface of the base circle portion, said surfaces on the base circle and lobe portions blending smoothly into one another near the junction of the base circle and lobe portions.

11. Valve operating mechanism comprising threadingly engaged screw and nut members, a spring normally biasing the members apart, a tappet engageable with one of the members having a cam contacting surface on one end thereof, a cam rotatable about an axis substantially perpendicular to the axis of the tappet including a lobe portion and a base circle portion, the surface of the base circle portion of which is slightly angularly disposed to the axis of the cam, with maximum angularity at its midpoint and decreasing substantially uniformly in angularity from the midpoint thereof to substantially zero angularity at the opposite ends thereof, and the surface of the lobe portion of which is slightly angularly disposed to the axis of the cam, oppositely to the angularity of the surface on the base circle portion with maximum angularity at its midpoint and decreasing substantially uniformly to substantially zero angularity at the opposite ends thereof near the opposite ends of the surface of the base circle portion, and a rocker arm engageable with the member which the tappet is not engageable with.

12. A mechanism according to claim 11 wherein the rocker arm and tappet have frictional connection with the member with which they are respectively engaged.

References Cited in the file of this patent

UNITED STATES PATENTS

| Number | Name | Date |
|---|---|---|
| 1,305,397 | Murdock | June 3, 1919 |
| 1,905,888 | Berry | Apr. 25, 1933 |